US008924799B2

(12) United States Patent
Banerjee et al.

(10) Patent No.: US 8,924,799 B2
(45) Date of Patent: Dec. 30, 2014

(54) METHOD AND SYSTEM FOR PROVIDING A PREDEFINED CONTENT TO A USER

(75) Inventors: Debashis Banerjee, Bangalore (IN); Anand Balachandran, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 325 days.

(21) Appl. No.: 13/447,301

(22) Filed: Apr. 16, 2012

(65) Prior Publication Data

US 2013/0275819 A1     Oct. 17, 2013

(51) Int. Cl.
 *G06F 11/00* (2006.01)
 *G06F 11/07* (2006.01)

(52) U.S. Cl.
 CPC ........ *G06F 11/0769* (2013.01); *G06F 11/0748* (2013.01); *G06F 11/0775* (2013.01); *G06F 11/0781* (2013.01); *G06F 11/0784* (2013.01)
 USPC ......................................................... 714/48

(58) Field of Classification Search
 USPC ......................................................... 714/48
 See application file for complete search history.

(56) References Cited

U.S. PATENT DOCUMENTS

| 8,572,427 | B1 * | 10/2013 | Stancu-Mara et al. | 714/4.1 |
|---|---|---|---|---|
| 8,676,905 | B2 * | 3/2014 | Lee | 709/206 |
| 2003/0046384 | A1 * | 3/2003 | Sirivara et al. | 709/224 |
| 2004/0122870 | A1 * | 6/2004 | Park et al. | 707/201 |
| 2006/0133377 | A1 * | 6/2006 | Jain | 370/392 |
| 2007/0266316 | A1 * | 11/2007 | Butlin et al. | 715/700 |
| 2008/0005253 | A1 * | 1/2008 | Vincent | 709/206 |
| 2008/0285496 | A1 * | 11/2008 | Fuchs et al. | 370/311 |
| 2009/0100402 | A1 * | 4/2009 | Heuler et al. | 717/100 |
| 2010/0036894 | A1 * | 2/2010 | Senda et al. | 707/202 |
| 2010/0115346 | A1 * | 5/2010 | Lee | 714/49 |
| 2011/0302316 | A1 * | 12/2011 | Chou et al. | 709/228 |
| 2013/0007260 | A1 * | 1/2013 | Jain et al. | 709/224 |
| 2013/0166738 | A1 * | 6/2013 | Ivershen | 709/224 |
| 2013/0191360 | A1 * | 7/2013 | Burkard et al. | 707/706 |
| 2013/0254385 | A1 * | 9/2013 | Lyon | 709/224 |

* cited by examiner

*Primary Examiner* — Bryce Bonzo
(74) *Attorney, Agent, or Firm* — James J. DeCarlo; Greenberg Traurig, LLP

(57) ABSTRACT

A computer-implemented method of providing a predefined content to a user includes generating an error message at a user device, the error message based on unavailability of the predefined content to the user at a first instance of time. The method also includes receiving one or more error messages by a server, the one or more error messages being received from one or more user devices. Further, the method includes creating a list of one or more parameters by the server. Furthermore, the method includes providing the predefined content to the user at a second instance of time based on a predefined threshold of the one or more parameters in the list.

18 Claims, 4 Drawing Sheets

List of page: URL : www. xyz.com

User Count: 0-N

Page friendly to devices: [list of devices]

Users : [user, time of access, number of access, device accessed on]

Threshold defined: X ( in number of user errors)

Time to Live for Information: X (in seconds, minutes, hours up to maximum value in time which is configurable)

Threshold breach time: X (stores time of breach of threshold)

Threshold breach: Y/N

FIG. 3

METHOD AND SYSTEM FOR PROVIDING A PREDEFINED CONTENT TO A USER

TECHNICAL FIELD

Embodiments of the disclosure relate generally, to browsing content over the internet, and more specifically, to browsing an unavailable content on a website.

BACKGROUND

Typically, a user browses an article of a website using an electronic device. Examples of the electronic device include but are not limited to a personal computer, a laptop, a mobile phone, a tablet personal computer, and a personal digital assistant.

The user attempts to browse articles from a specific electronic device which serves a specific version of content in the website. However, the content may not be available on a server or it may not display on a client device. In one example, the user attempts to browse content from a first electronic device, for example a mobile phone. However, the content is unavailable to the user. In another example, the content is available in the first electronic device, for example the laptop. The user desires to browse the content from a second electronic device, for example, a mobile phone. However, the content is unavailable to the user in the second electronic device. Often, the user intends to view the unavailable content at a later instance of time.

In light of the foregoing discussion, there is a need for a method and system for providing unavailable content to the user at a later instance of time or on another electronic device.

SUMMARY

The above-mentioned needs are met by a computer-implemented method, a system, and a computer program product for providing unavailable content to a user.

An example of a computer-implemented method for providing a predefined content to a user includes generating an error message at a user device, wherein the error message is based on unavailability of the predefined content to the user at a first instance of time. The method includes receiving one or more error messages by a server, wherein the one or more error messages are received from one or more user devices. Further, the method includes creating a list of one or more parameters by the server. Furthermore, the method includes providing the predefined content to the user at a second instance of time based on a predefined threshold of the one or more parameters in the list.

An example of a computer program product stored on a non-transitory computer-readable medium that when executed by a processor, performs a method of providing a predefined content to a user includes generating an error message at a user device, wherein the error message is based on unavailability of the predefined content to the user at a first instance of time. The computer program product also includes receiving one or more error messages by a server, wherein the one or more error messages are received from one or more user devices. The computer program product includes creating a list of one or more parameters by the server. Further, the computer program product includes providing the predefined content to the user at a second instance of time based on a predefined threshold of the one or more parameters in the list.

An example of a system for providing a predefined content to a user includes an error module for generating an error message at a user device, wherein the error message is based on unavailability of the predefined content to the user at a first instance of time. The system includes a receiver module for receiving one or more error messages by a server, wherein the one or more error messages are received from one or more user devices. Further, the system includes a list creation module for creating a list of one or more parameters by the server. Furthermore, the system includes a content module for providing the predefined content to the user at a second instance of time based on a predefined threshold of the one or more parameters in the list.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

FIG. 3 is an exemplary illustration of a list, in accordance with one embodiment.

DETAILED DESCRIPTION OF THE EMBODIMENTS

A computer-implemented method, system, and computer program product for providing a predefined content to a user is disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Further, in the present disclosure, relational terms such as first and second, and the like, can be used to distinguish one entity from the other, without necessarily implying any actual relationship or order between such entities.

Figure 1:
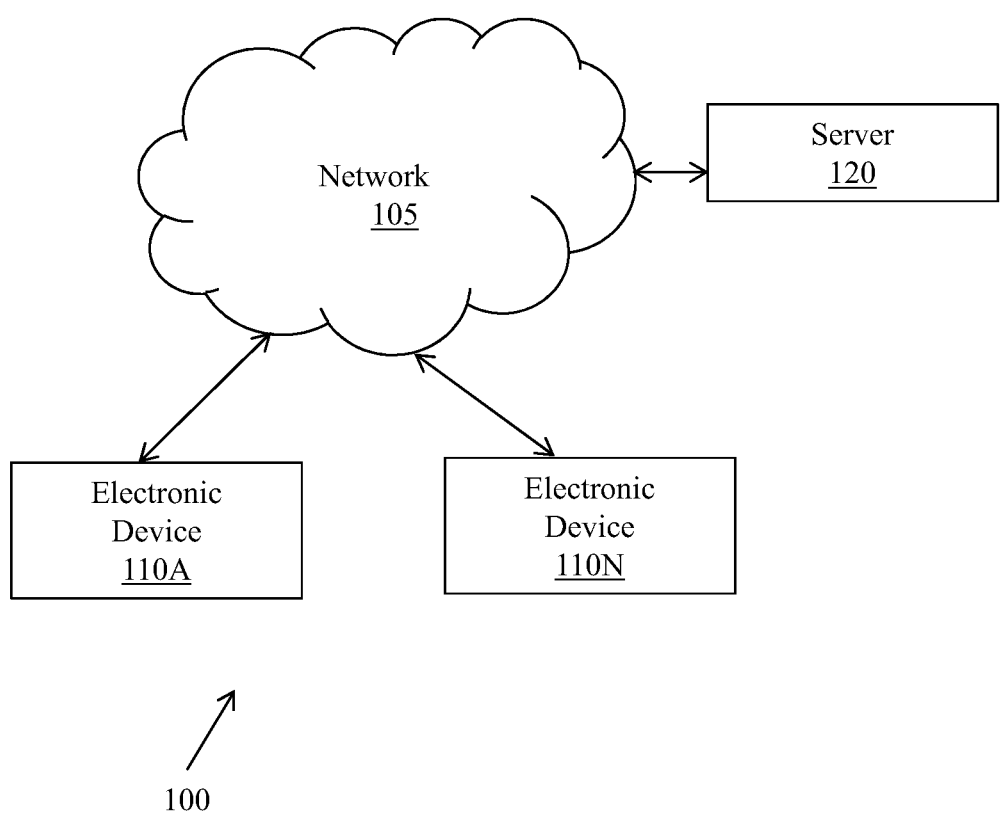
FIG. 1 is a block diagram of an environment, in accordance with which various embodiments can be implemented.

FIG. 1 is a block diagram of an environment 100. The environment 100 includes an electronic device, for example an electronic device 110A and an electronic device 110N. An example of the electronic device includes, but is not limited to, a personal computer, a laptop, a mobile phone, and a personal digital assistant (PDA).

The electronic device is connected to a network 105. The electronic device uses the network 105 to establish a connection with a server 120. In the present disclosure, the server 120 hosts a webpage. A user browses the webpage through the network 105 using the electronic device.

Figure 2:
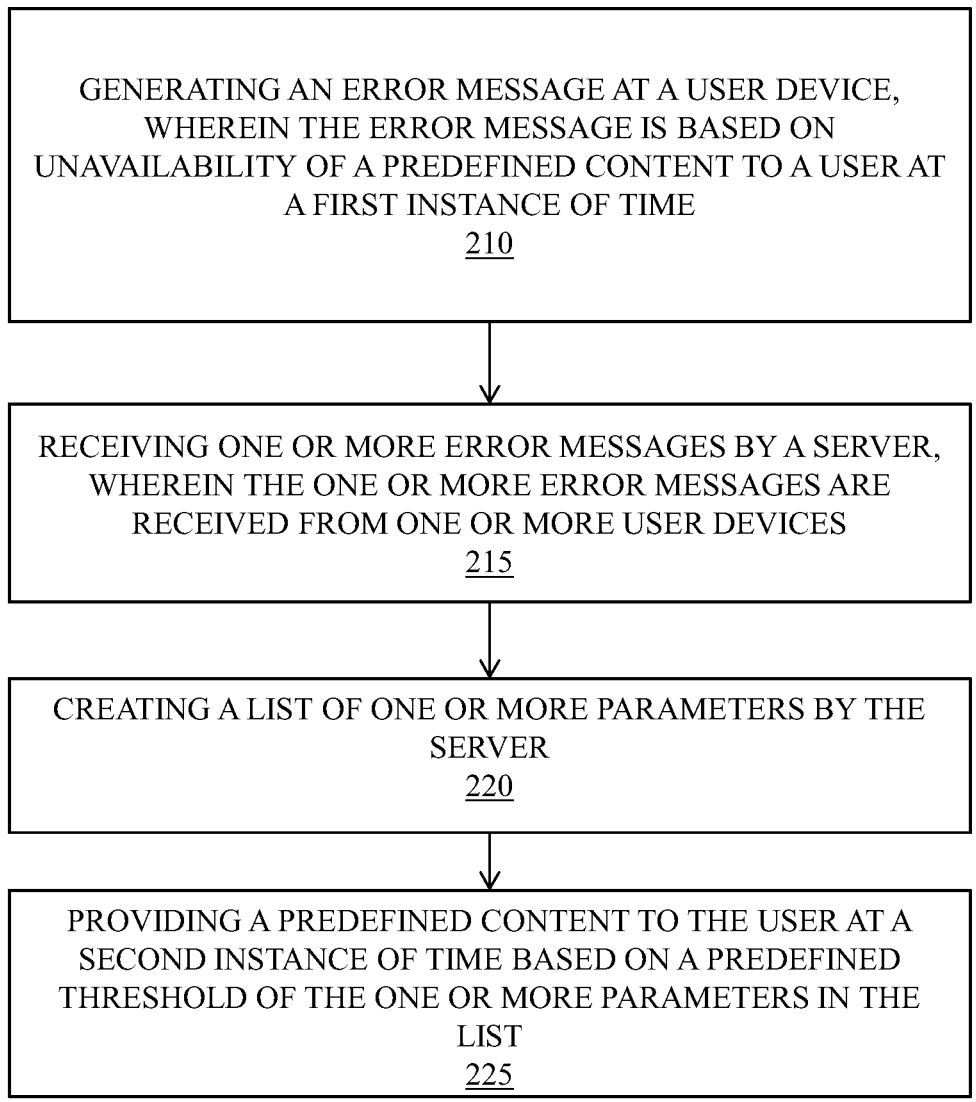
FIG. 2 is a flow diagram illustrating a method of providing a predefined content to a user, in accordance with one embodiment.

FIG. 2 is a flow diagram illustrating a method of providing a predefined content to a user.

At step 210, an error message is generated at a user device. The user device is an electronic device. The user device is also referred to as a client device. The error message is based on unavailability of the predefined content to the user at a first instance of time. The error message includes a hypertext transfer protocol (HTTP) error message. In one embodiment the HTTP error message is an error on the client device in accessing content via HTTP. In another embodiment, the HTTP error message includes a HTTP server side error message.

Some examples of HTTP errors and response actions in accordance with one embodiment is shown below. The below list is representative of a sample set and the method proposed here provides unavailable content on other standard HTTP error responses also.

(a) 400 bad request: change to a different client device
(b) 401 unauthorized: serve on another client device
(c) 408 request timeout: try another client device later
(d) 404 not found: try again when webpage comes back
(e) 413 requested entity is too large. Serve the webpage later
(f) 444 no response: Serve the webpage later
(g) 503 server unavailable: Attempt to reconnect based on a predefined list at a later time.
(h) 504 gateway timeout—Serve the webpage later At step 215, one or more error messages are received by a server. In one embodiment, the one or more error messages are received from one or more user devices. In another embodiment, the one or more error messages are received from a user device, for example, a laptop or mobile phone. The server stores the one or more error messages.

At step 220, a list of one or more parameters is created by the server. The list of one or more parameters includes at least one of a uniform resource locator (URL) of the predefined content, information on number of times a user clicked on the predefined content available in the URL and received an error message, and information on the number of users receiving an error message. The one or more parameters in the list are prioritized based on a predefined threshold. The server maintains the list for a predefined time.

In one example, a user Alice visits the URL http://news.yahoo.com at 1 pm on a certain day and clicks on a sports news link, for example [http://news.yahoo.com/tiger-gets-back-does-best-072309318--spt.html].The user Alice gets a HTTP 400 error and the error is logged on the server. The user Alice visits the URL again at 3 pm and gets a HTTP 404 error. By 5 pm, the server solves the HTTP 400 error and the HTTP 404 error. When the user Alice logs into http://www.news.yahoo.com again at a later time, say 6 pm, the user Alice is able to view the content in the sports news link.

In another example, users Alice, Bob and Charlie visit http://news.yahoo.com at different times of day and clicks on the sports news link, for example [http://news.yahoo.com/tiger-gets-back-does-best-072309318--spt.html]. Each of them gets a HTTP 404 error. The server creates a list of one or more parameters. The list includes the URL of the sports news content. The list may also include information on number of times a user clicked on the sports news link. Further, the list may also include number of users receiving the HTTP error message. The server then prioritizes the one or more parameters in the list based on a predefined threshold. In one example, the predefined threshold can be a certain minimum percentage of total number of users that received the HTTP error message by clicking on the sports news link. The server maintains the list for a predefined time. In one example, the server maintains the list till 8 pm of the day within which the user Alice needs to click to be served with the sports news link.

In accordance to one embodiment of the disclosure, a first use case includes browsing on a first device at a first instance of time and upon encountering an error, browsing on a second device.

Use Case 1: Browse on Different Device on Error
1. A user searches for a search string on a mobile phone. In one example, www.xyz.com is search result. The user clicks on the search result.
2. The search result is not shown to the user since there is no mobile version of the search result.
3. The user logs into browser using desktop or tablet later.
4. The user goes to www.xyz.com and is served the search result.

In accordance to another embodiment of the disclosure, a second use case includes browsing on a first device at a first instance of time and browsing at a second instance of time upon encountering an error.

Use Case 2: Browse Later When Receiving an Error
1. A user searches for a search string. In one example, www.xyz.com is the search result. The user clicks on the search result.
2. The user receives HTTP error as webpage cannot be served.
3. One or more number of users keeps attempting to click on the search result.
4. The webpage comes back up after a pre-defined time.
5. The search result is served to the user.

At step 225, a predefined content is provided to the user at a second instance of time based on a predefined threshold of the one or more parameters in the list.

An example of the list of one or more parameters is described in the description of FIG. 3.

FIG. 3 is an exemplary illustration of a list, in accordance with one embodiment.

In one embodiment, the list of one or more parameters is referred to as a Time to live parameter list. Time to live parameter can be set for specific webpages. A default time to live parameter could be a value of 1 day starting at values, for example 5 minutes. Referring to FIG. 3, list of webpage includes details of an URL. A user count includes number of users attempting to browse an article or content in a link. The list includes a list of devices that are compatible for viewing the article or the content in the link. The list also includes details of the user, time of access, number of access, and device accessed on. The list can also include details of a predefined threshold, for example, number of user errors, a time to live for information, and a threshold breach time.

Figure 4:
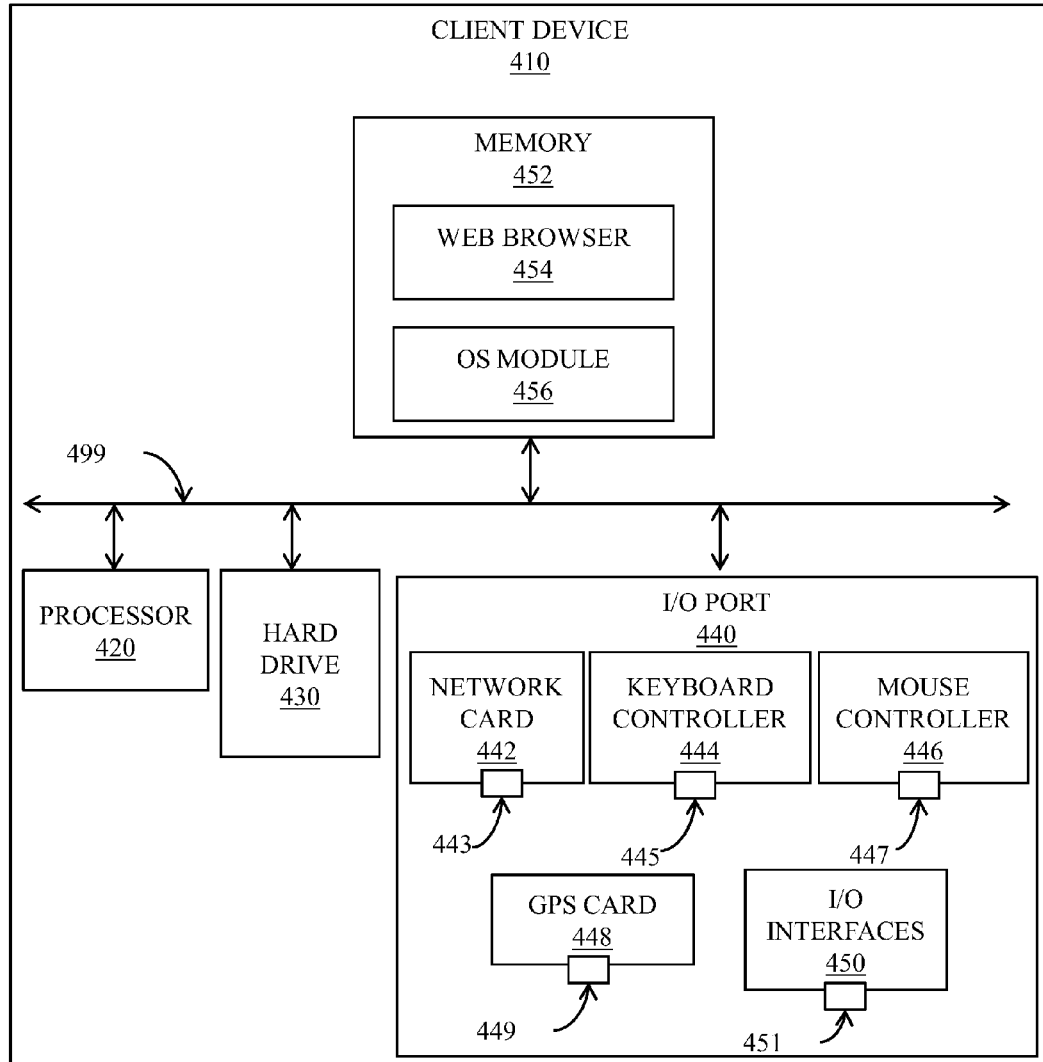
FIG. 4 is a block diagram illustrating an exemplary computing device, in accordance with one embodiment.

FIG. 4 is a block diagram illustrating an exemplary electronic device, in accordance with one embodiment. The electronic device is also referred to as client device.

The client device 410 includes a processor 420, a hard drive 430, an I/O port 440, and a memory 452, coupled by a bus 499.

The bus 499 can be soldered to one or more motherboards. Examples of the processor 420 includes, but is not limited to, a general purpose processor, an application-specific integrated circuit (ASIC), an FPGA (Field Programmable Gate Array), a RISC (Reduced Instruction Set Controller) processor, or an integrated circuit. There can be a single core or multiple cores processor. In one embodiment, the processor 420 is specially suited for processing demands of location-aware reminders (for example, custom micro-code, and instruction fetching, pipelining or cache sizes). The processor 420 can be disposed on silicon or any other suitable material. In operation, the processor 420 can receive and execute instructions and data stored in the memory 452 or the hard drive 430. The hard drive 430 can be a platter-based storage device, a flash drive, an external drive, a persistent memory device, or other types of memory.

The hard drive 430 provides persistent (long term) storage for instructions and data. The I/O port 440 is an input/output panel including a network card 542 with an interface 443, along with a keyboard controller 444, a mouse controller 446, and a GPS card 448. The network card 442 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 443 is configured according to networking compatibility. For example, a wired networking card includes a physical port to plug in a cord, and a wireless networking card includes an antennae. The network card 442 provides access to a communication channel on a network. The keyboard controller 444 can be coupled to a physical port 445 (for example, PS/2 or USB port) for connecting a keyboard. The keyboard can be a standard alphanumeric keyboard with 101 or 104 keys (including alphabetic, numerical and punctuation keys, a space bar, modifier keys, etc.), a laptop or notebook keyboard, a thumb-sized keyboard, a virtual keyboard, or the like. The mouse controller 446 can also be coupled to a physical port 447 (for example, mouse or USB port). The GPS card 438 provides communication to GPS satellites operating in space to receive location data. An antenna 449 provides radio communications (or alternatively, a data port can receive location information from a peripheral device).

The memory 452 can be a RAM (Random Access Memory), a flash memory, a non-persistent memory device, or other devices capable of storing program instructions being executed. The memory 452 comprises of a web browser 454 and an Operating System (OS) module 456. In other embodiments, the memory 452 comprises a calendar application that manages a plurality of appointments. The OS module 456 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

Furthermore, a computer that is running the previously mentioned computer software can be connected to a network and can interface to other computers using the network. The network can be an intranet, or the internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instanceiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
   receiving, by a processor, one or more error messages by a server, wherein the one or more error messages are received from one or more user devices and wherein the one or more error messages are based on unavailability of predefined content to a user at a first instance of time;
   in response to the receiving of the one or more error messages, creating, by the processor, a list of one or more parameters by the server; and
   transmitting, by the processor, the predefined content to the user at a second instance of time based on a predefined threshold of the one or more parameters in the list.

2. The method of claim 1, wherein the one or more error messages comprise a hypertext transfer protocol (HTTP) error message, wherein the HTTP error message comprises at least one of a HTTP client side error message and a HTTP server side error message.

3. The method of claim 1, wherein the one or more user devices comprises at least one of a laptop, a mobile phone, and a tablet personal computer.

4. The method of claim 1, wherein the receiving the one or more error messages comprises: storing the one or more error messages in the server.

5. The method of claim 1, wherein the list of one or more parameters comprises at least one of a uniform resource locator (URL) of the predefined content, information on number of times a user clicked on the predefined content available in the URL and received an error message, and information on the number of users receiving an error message.

6. The method of claim 1, wherein the one or more parameters in the list are prioritized based on the predefined threshold.

7. The method of claim 1, wherein the list is maintained for a predefined time.

8. A non-transitory computer-readable storage medium that when executed by a processor, performs a method comprising:

receiving, by the processor, one or more error messages by a server, wherein the one or more error messages are received from one or more user devices and wherein the one or more error messages are based on unavailability of predefined content to the user at a first instance of time;

creating, by the processor, a list of one or more parameters by the server; and transmitting, by the processor, the predefined content to the user at a second instance of time based on a predefined threshold of the one or more parameters in the list.

9. The medium of claim 8, wherein the one or more error messages comprise a hypertext transfer protocol (HTTP) error message, wherein the HTTP error message comprises at least one of a HTTP client side error message and a HTTP server side error message.

10. The medium of claim 8, wherein the one or more user devices comprises at least one of a laptop, a mobile phone, and a tablet personal computer.

11. The medium of claim 8, wherein the receiving the one or more error messages comprises:

storing the one or more error messages in the server.

12. The medium of claim 8, wherein the list of one or more parameters comprises at least one of a uniform resource locator (URL) of the predefined content, information on number of times a user clicked on the predefined content available in the URL and received an error message, and information on the number of users receiving an error message.

13. The medium of claim 8, wherein the one or more parameters in the list are prioritized based on the predefined threshold.

14. The medium of claim 8, wherein the list is maintained for a predefined time.

15. A system comprising:

a receiver module executed by a processor for receiving one or more error messages by a server, wherein the one or more error messages are received from one or more user devices and wherein the one or more error messages are based on unavailability of the predefined content to the user at a first instance of time;

a list creation module executed by the processor for creating a list of one or more parameters by the server; and a content module executed by the processor for transmitting the predefined content to the user at a second instance of time based on a predefined threshold of the one or more parameters in the list.

16. The system of claim 15, wherein the list of one or more parameters comprises at least one of a uniform resource locator (URL) of the predefined content, information on number of times a user clicked on the predefined content available in the URL and received an error message, and information on the number of users receiving an error message.

17. The system of claim 15, wherein the one or more parameters in the list are prioritized based on the predefined threshold.

18. The system of claim 15, wherein the list is maintained for a predefined time.

* * * * *